Feb. 6, 1923.
F. TAYLOR.
CINDER SIFTER OR COLLECTOR.
FILED SEPT. 19, 1921.
1,444,713.
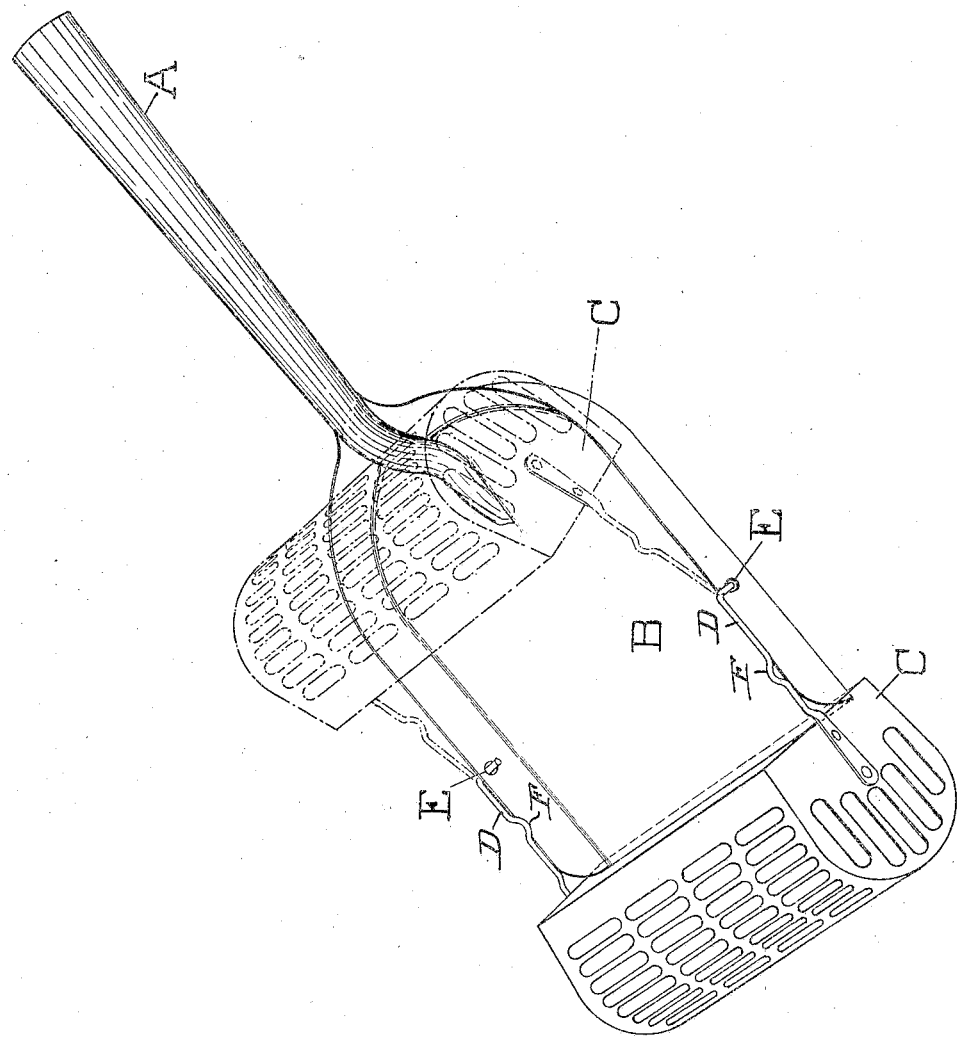

Patented Feb. 6, 1923.

1,444,713

UNITED STATES PATENT OFFICE.

FRANCIS TAYLOR, OF WHITCHURCH, ENGLAND.

CINDER SIFTER OR COLLECTOR.

Application filed September 19, 1921. Serial No. 501,558.

*To all whom it may concern:*

Be it known that I, FRANCIS TAYLOR, subject of the King of Great Britain, residing at Whitchurch, Shropshire, in the Kingdom of England, have invented certain new and useful Improvements in or Relating to Cinder Sifters or Collectors, of which the following is a specification.

The present invention relates to cinder sifters or collectors and has for its principal object the provision of a small, household appliance in the form of a combined shovel and sifter whereby the operator may withdraw the ashes and cinders from the ash-pit of the fire, riddle them so as to separate the ashes, and then throw the cinders back onto the fire.

In general the device comprises a shovel to the sides of the blade of which are attached pivot members which carry the sifter so that the latter may be swung from its position at the juncture of the shovel handle and the blade, when not in use, to its operative or sifting position adjacent the lower edge of the shovel blade and vice versa.

The pivots of the cinder sifter, as stated, are on the sides of the shovel, and consist of wire arms at the ends of which is a sieve of wire-work or perforated metal, into which the shovel blade fits with the sifter extending some distance beyond either side of the blade.

The shovel can be perforated near its end or not as desired.

Reference is had to the accompanying drawing which shows the device in perspective.

In this A is the handle, B the shovel, C the sieve, D the stout wires carrying the sieve and E the pivot. F is a projection on each side of the shovel which can be used to prevent the sieve falling below the shovel. This however is hardly necessary.

The mode of action is as follows:—The sieve is thrown back resting on the shovel until below position where it is grasped by the operator. The latter digs into the ashes in the ash pit with the shovel, extracts a shovelful, and then moves the sieve into operative or sifting position and shakes the entire device whereupon the ashes pass through the perforations in the sieve C and the cinders are retained.

In making the sieve, I locate the pivot wires D parallel with the shovel sides, and are preferably bowed or curved at their outer ends in order to embrace the sieve C, which is wider than the shovel blade. The wire then extends parallel with the side of the sieve or nearly so until it comes to the hole in which it is pivoted.

I claim as my invention.—

A device of the character described comprising in combination a shovel, including a blade and a handle; a pair of arms pivoted at their inner ends in the sides of the shovel blade substantially midway of its length; a sieve connected to the outer ends of said pivoted arms whereby through the movement of said arms the sieve may be swung from its inoperative position at the juncture of the handle shank and the blade to its operative position with its open end in line with the lower edge of the shovel blade and vice versa; and means for preventing the sieve from passing beyond its operative position.

In witness whereof, I have hereunto signed my name this 30th day of August, 1921, in the presence of two subscribing witnesses.

FRANCIS TAYLOR.

Witnesses:
JOHN MCLACHLAN,
DORIS M. THOMAS.